FERROELECTRIC STORAGE CIRCUITS

Filed June 16, 1953 4 Sheets-Sheet 1

INVENTOR
J. R. ANDERSON
BY James W. Falk
ATTORNEY

Nov. 23, 1954 J. R. ANDERSON 2,695,397

FERROELECTRIC STORAGE CIRCUITS

Filed June 16, 1953 4 Sheets-Sheet 2

INVENTOR
J. R. ANDERSON
BY
James J. Falk
ATTORNEY

INVENTOR
J. R. ANDERSON
BY James W. Falk
ATTORNEY

INVENTOR
J. R. ANDERSON
BY [signature]
ATTORNEY

United States Patent Office 2,695,397

Patented Nov. 23, 1954

2,695,397

FERROELECTRIC STORAGE CIRCUITS

John R. Anderson, Berkeley Heights, N. J., assignor to Bell Telephone Laboratories, Incorporated, New York, N. Y., a corporation of New York Application June 16, 1953, Serial No. 361,941

19 Claims. (Cl. 340—173)

This invention relates to electrical circuits for the storage of information and more particularly to such circuits utilizing ferroelectric elements.

As disclosed in application Serial No. 254,245, filed November 1, 1951, of J. R. Anderson, ferroelectric substances, such as barium titanate, when subjected to an electric field exhibit a relationship between electric field intensity and polarization of the general form of the hysteresis loop exhibited by ferromagnetic materials. By utilizing the ferroelectric material as the dielectric of a condenser, this hysteresis effect can be used for storage and read out of information. Generally, as described in the above-mentioned application, the ferroelectric material is polarized in one direction initially; information is then stored by applying voltages to the electrodes of the condenser to reverse this polarization. The stored information is then read out by applying voltages to the electrodes to restore the initial polarization. The magnitude of the output pulse will depend on the polarity of the polarization of the ferroelectric material and thus on whether information has been stored in the condenser, because of the different capacitance values of the condenser as different portions of the hysteresis loop of the ferroelectric dielectric are traversed.

A single slab or piece of a ferroelectric material may be utilized to provide the dielectric of a large number of condensers, and these condensers may be provided with common electrodes, as disclosed in application Serial No. 261,665, filed December 14, 1951, of J. R. Anderson. These condensers may be arranged in a storage matrix and a particular condenser of the matrix chosen for storage of information by having a voltage of one polarity applied to the common electrode on one side of that condenser and a voltage of the opposite polarity applied to the common electrode on the other side of that condenser, the two voltages being individually insufficient to reverse the polarization of the portion of the ferroelectric material between these two particular electrodes and comprising the dielectric of the condenser defined thereby but when occurring together being of the proper polarity and sufficient voltage to cause the reversal of the polarization of the material of this condenser across which they simultaneously appear and thus to cause storage of information. A third voltage may then be applied across the condensers of sufficient voltage and proper polarity to cause a return to the initial state of polarization of any ferroelectric material whose polarization had been thus reversed, thereby providing an output pulse indicating the stored information.

It is a general object of this invention to provide improved electrical information storage circuits utilizing ferroelectric elements.

It is another object of this invention to utilize the application of the same pulse to a ferroelectric memory condenser both for the reading out of information stored in that condenser and the application of a partial storage voltage thereto, information being stored by the concomitant application to the other electrode of the condenser of a voltage of opposite polarity, the two voltages together being sufficient to store information in the condenser.

It is a further object of this invention to provide improved access circuits for ferroelectric storage matrices.

Another object of this invention is to restore information read out of a ferroelectric storage matrix.

A still further object of this invention is to enable utilization of two-dimensional ferroelectric storage matrices with information appearing in serial form.

In one specific illustrative embodiment of this invention, a ferroelectric storage matrix is provided having a number of common electrodes extending in parallel on one face of a slab of a ferroelectric material and a number of common electrodes extending in parallel on the other face of the slab and perpendicular to the first group of electrodes, each spatial intersection of the common electrodes of the two groups defining a memory condenser or cell. An information address, identifying the particular address, location, or occurrence in the system to which the information to be stored relates, is applied to a selection switch which in turn applies a voltage to a particular row of condensers, i. e., to the particular electrode shared in common by these condensers assigned to that address. The output of the selection switch to the two-dimensional ferroelectric matrix includes, in accordance with one aspect of this invention, a differentiation circuit advantageously comprising a capacitance and a resistance.

The voltage pulse applied by the selection switch to the one common electrode of the ferroelectric matrix through this differentiation circuit is advantageously a square pulse of at least a voltage E sufficient to return the polarization of the memory condensers to which that electrode is common to their initial state of polarization and thus to read out or destroy any information that may be stored therein. The differentiation circuit causes this voltage that is applied to this common electrode and is initially E to decay due to charging of the capacitance. In accordance with one specific embodiment of this invention, the capacitance and resistance of the differentiation circuit are so related that the time constant of the circuit is such that when the initial pulse is removed, the capacitance will have charged to a voltage ½E. Thus, on removal of the initial pulse, the voltage output from the differentiation circuit will drop immediately to —½E.

In this way, a read-out pulse of +E volts is first applied to the row of condensers assigned to a given address to remove any information that may be stored in that row and then the same pulse applies the —½E volt pulse to the row to aid in the storing of information in certain of the cells of the row in accordance with the teaching of application Serial No. 261,665. As mentioned above, information is stored in accordance with the teaching of that application by simultaneously applying a voltage pulse of opposite polarity to the other electrode of a condenser, the two voltages together being sufficient to reverse the polarity of the polarization of the ferroelectric dielectric and thus to store information. In this specific embodiment of this invention, a +½E voltage pulse is applied to certain of the common electrodes on the opposite face of the slab of ferroelectric material so as to be present when the initial pulse from the selection switch is removed, which is the instant the voltage on the other common electrode drops to —½E.

A read-out gating pulse is also advantageously employed, together with a read-out AND circuit, so that information in a particular cell will only appear at the output of the two-dimensional storage matrix when the read-out gating pulse is present and not each time that information is being stored in certain of the cells or condensers of the storage matrix.

If it is desired to restore information read out from the storage matrix, an output pulse generator may be utilized, in accordance with another aspect of this invention, to provide a +½E voltage pulse in coincidence with the —½E voltage pulse from the differentiation circuit following the read-out to restore the information. If the information to be stored is applied to the ferroelectric storage matrix in serial form and is similarly to appear at the output of the matrix in serial form, in accordance with another aspect of this invention, the output pulse generators may be included in a delay line and specifically between delay elements which each introduce a one-digit delay.

It is a feature of this invention that a single pulse be applied to one electrode of a ferroelectric storage condenser through a differentiation circuit so that a voltage of sufficient magnitude to read out information is initially applied to the electrode and a voltage of reverse polarity for the storage of information in the condenser is applied to the electrode on cessation of the single pulse.

It is another feature of this invention that a single pulse be applied to one electrode of a ferroelectric storage condenser through a differentiation circuit so that a voltage of sufficient magnitude to read out information is initially applied to the electrode and a voltage of reverse polarity and insufficient by itself to store information is applied to the electrode when the single pulse is removed, a voltage being coincidentally applied to the other electrode of the condenser if information is to be stored.

It is a further feature of this invention that access to ferroelectric cells or condensers of a two-dimensional storage matrix be through a differentiation circuit to enable a single pulse to provide both the read-out voltage and the storage voltage to one side of each of the ferroelectric condensers. More specifically, in accordance with this feature of the invention, the differentiation circuit is so arranged that, on cessation of the initial pulse, the voltage applied to the one side of the ferroelectric condensers may be substantially one half the voltage required across the condenser for the storage of information.

It is a still further feature of this invention that pulse regeneration circuits be employed in the output circuit of a ferroelectric storage matrix to restore information that has been read from the storage matrix. More specifically, in accordance with this feature of the invention, the regeneration circuits may provide a voltage in coincidence with the voltage from the differentiation circuit on cessation of the initial pulse applied thereto, the two voltages together being of proper polarity and voltage to restore the information read out on application of the initial pulse to the differentiation circuit.

It is a still further feature of this invention that the regeneration circuits may be included in delay lines to enable utilization of two-dimensional storage matrices with information appearing in serial form.

A complete understanding of this invention and of these and various other features thereof may be gained from consideration of the following detailed description and the accompanying drawing in which.

Figure 1:
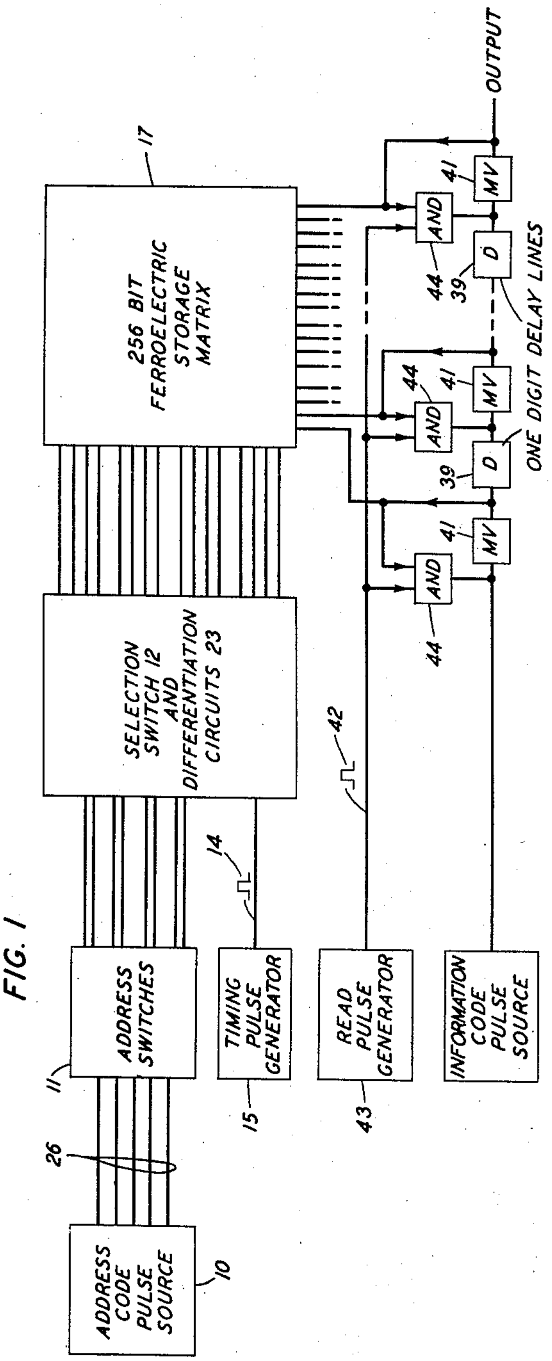
Fig. 1 is a representation, in block diagram form, of one specific illustrative embodiment of this invention.
Figures 7, 8:
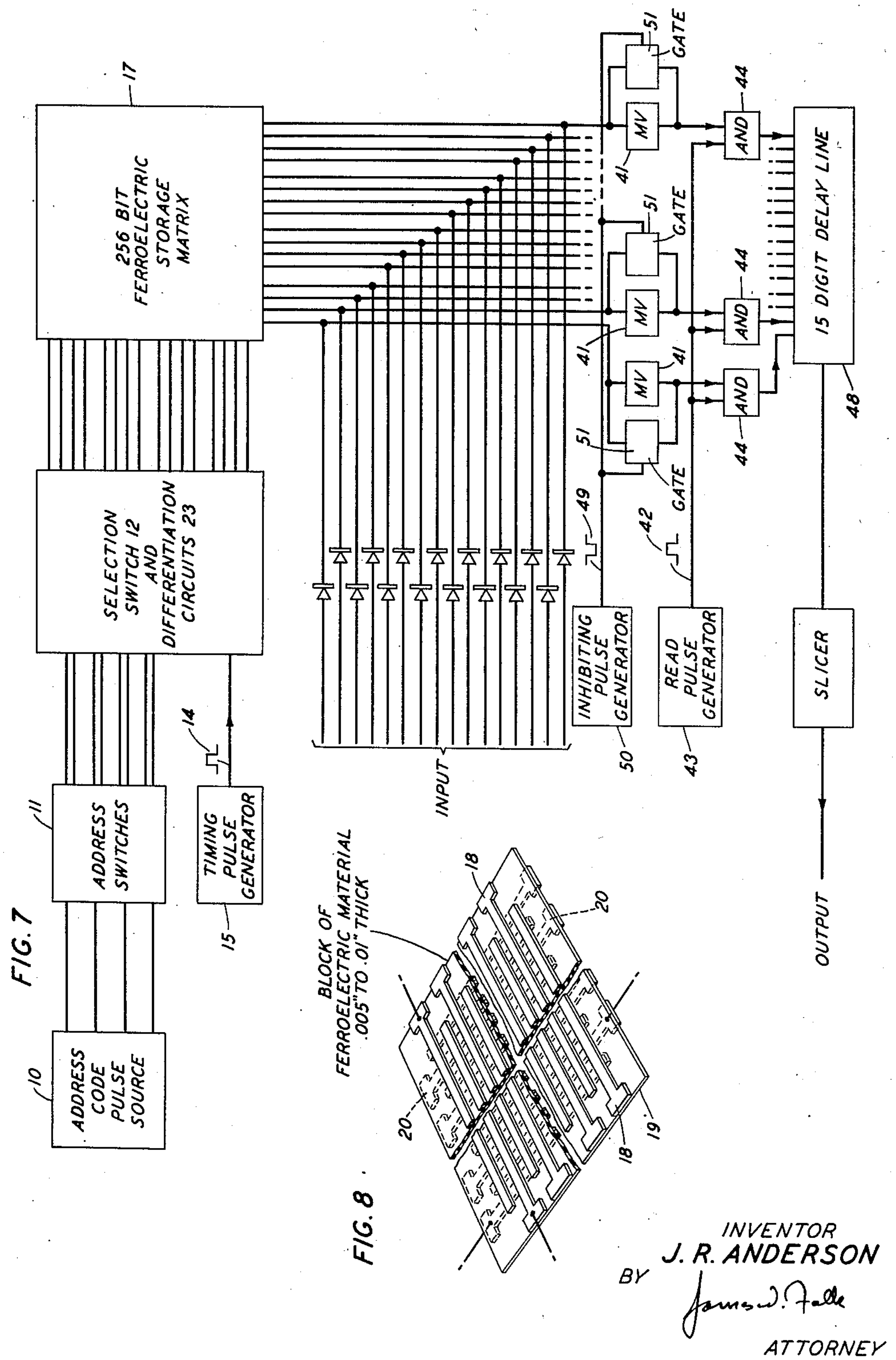
Fig. 7 is a representation, mainly in block diagram form, of another specific illustrative embodiment of this invention.
Fig. 8 is a plan view of a ferroelectric storage matrix that may be employed in the specific embodiments of this invention of Figs. 1 and 7.

Turning now to Fig. 1, one specific illustrative embodiment of this invention is there depicted in block diagram form. The information to be stored relates to a particular address or location in the system and is identified by an address code which may be considered as supplied from an address code pulse source 10. Advantageously, this address may be in the form of a binary code and is applied to address switches 11 which apply a voltage to a particular lead of a selection switch or translator 12 to enable the selection switch to allow a pulse 14 from a timing pulse generator 15 to be applied to the common electrodes of a ferroelectric storage matrix 17 designated by the address. The ferroelectric storage matrix may advantageously be of the type described in application Serial No. 261,665, filed December 14, 1951, of J. R. Anderson wherein, as seen in Fig. 8, a parallel array of electrodes 18 is placed on one face of a slab of a ferroelectric material 19, such as barium titanate, and a second parallel array of electrodes 20 is placed on the opposite face of the slab, the two arrays being perpendicular. In the specific illustrative embodiment of this invention depicted, the storage matrix can store two hundred fifty six individual bits of information, each array comprising sixteen common electrodes.

In order to store information in any cell or condenser of the two-dimensional matrix, a voltage —E is applied across the electrodes connected to that storage cell. This may be accomplished, as disclosed in application Serial No. 261,665, by simultaneously applying a voltage —½E to the top electrode and a voltage +½E to the bottom electrode. To read out all of the information in any row of condensers in the matrix, a single readout pulse +E volts in amplitude is applied to the electrode of the selected row. An output pulse then appears on the leads of the other electrodes connected to each condenser of the row in which a binary "1" was stored.

To facilitate a description of this invention, the leads to the common electrodes of the storage matrix from the selection switch 12 will be referred to as "row" and the condensers connected to such a common electrode as a "row of condensers." Also, the leads to the common electrodes of the storage matrix on the other face of the slab of ferroelectric material will be referred to as "columns" and the condensers connected thereto as a "column of condensers."

Figure 2:
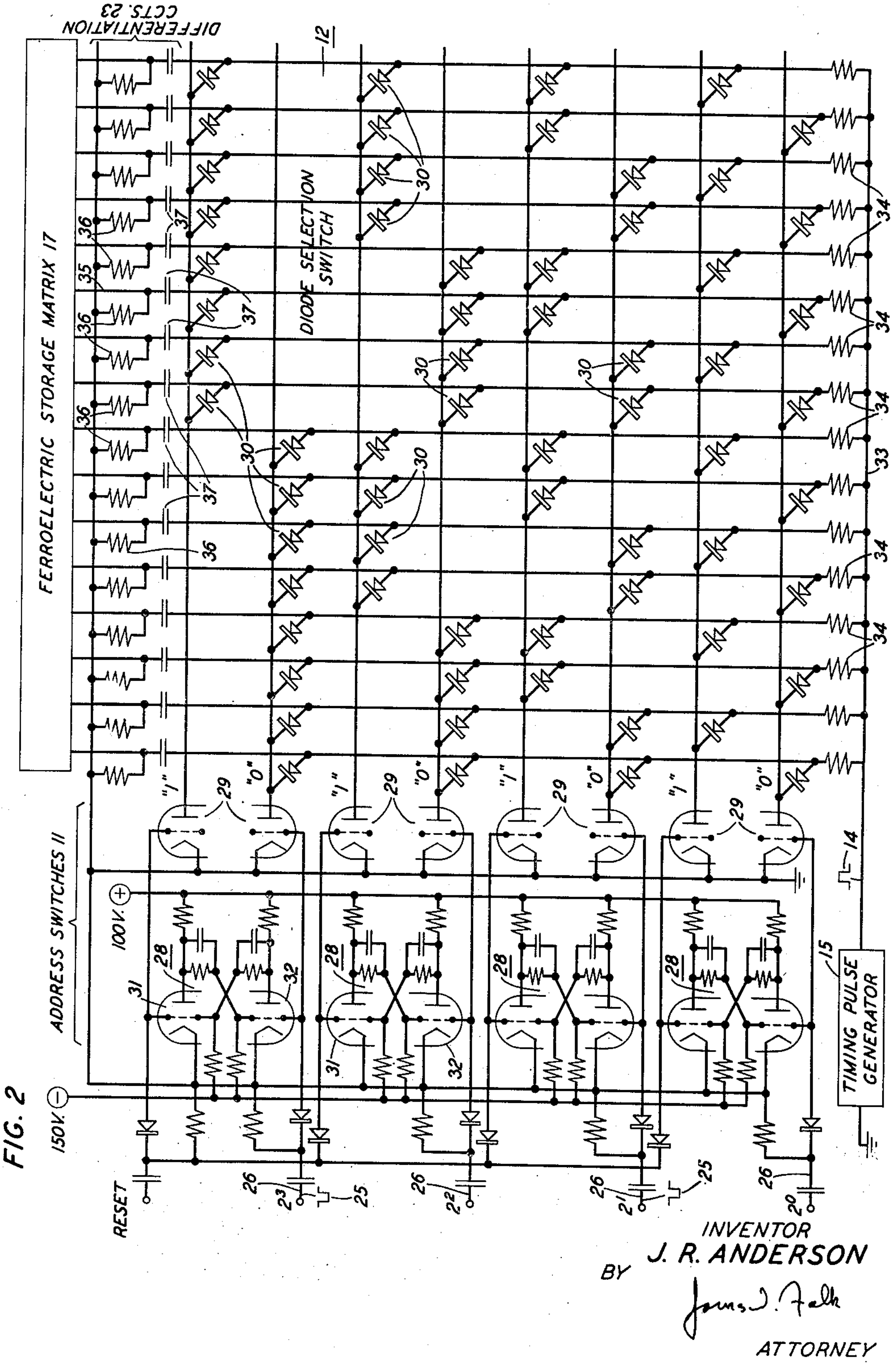
Fig. 2 is a schematic representation of specific illustrative embodiments of address switches, diode selection switch, and differentiation circuits of the embodiment of Fig. 1.

When information is to be stored in a group of condensers assigned a given address, a binary code identifying that address is applied to the selection switch 12, best seen in Fig. 2, and a pulse 14 of magnitude E volts is also applied from a timing pulse generator 15 to the selection switch 12. Ignoring for a moment the differentiation circuits 23 interposed in each row between the selection switch and the matrix 17, a voltage pulse of +E volts is thus applied to those rows of condensers designated by the code address. In the specific embodiment of these circuit elements depicted in Fig. 2 assuming the code address to be the binary message "1010" indicating that information is to be read out or stored relating to that element or occurrence in the system identified by the binary number 1010, which is equivalent to decimal ten, pulses 25 will be applied to input leads 26 of the address switches corresponding to the $2^3$ and $2^1$ digits in the binary code; and no pulses will be applied to the leads 26 of the switches corresponding to the $2^2$ and $2^0$ digits in the binary code.

The address switches may be of any of several general types capable of delivering either of two outputs depending on the presence or absence of an input signal. The specific switches depicted in Fig. 2 are of the type illustrated at page 145 of volume 37 of the Proceedings of the I. R. E. (February 1949) and comprise, for each digit of the binary address code, a resistance-coupled bistable multivibrator circuit 28 and a pair of isolating buffer amplifiers 29 placed between the multivibrator circuit and the selection switch 12.

The selection switch 12 may advantageously comprise rectifiers or diodes 30 and be of the general type described in an article, "Rectifier Networks for Multiple Switching," by D. R. Brown and N. Rochester at page 139 of volume 37 of the Proceedings of the I. R. E. (February 1949). However, various other known types of translators or selection switches might advantageously be employed, such as of the types employing magnetic cores, as described in an article by J. A. Rajchman entitled, "Static Magnetic Matrix Memory or Switching Circuits," in volume 13, No. 2, of the RCA Review (June 1952).

Application of a code pulse 25 of the address message to an input lead 26 of a multivibrator circuit 28 causes conduction to shift from the normally conducting triode 31 of the circuit to the normally non-conducting triode 32 and also extinguishes conduction in the buffer amplifier 29 associated with triode 31 while causing conduction to commence in the buffer amplifier associated with triode 32. All the diodes 30 are connected to a common input lead 33 through load resistors 34. Therefore, when a pulse 14 from the timing pulse generator 15 is applied to lead 33, the voltage across resistor 34 will be low if any diode connected to that resistor is also connected to ground through a conducting amplifier 29. Application of a binary code message "1010" to the address switches thus causes conduction to occur in the buffer amplifiers such that each row lead except the tenth row lead 35 will have at least one diode 30 connected to ground. A reset pulse is advantageously applied to the address switch to reset the bistable multivibrator circuits to zero before application of the next code message or address.

In the example being described, the diode selection switch 12 will therefore operate to allow passage of a pulse 14 through it only along the tenth row lead 35, i. e., to the row of electrodes common to the condensers assigned to this tenth element or occurrence in the system. The pulse 14, as mentioned before, is supplied by a timing pulse generator 15 and is of a magnitude at least +E volts sufficient to cause a reversal of polarity of polarization of the ferroelectric material of the storage matrix. Advantageously, the pulse 14 is applied to the selection switch at regular timed intervals, the repetition rate depending on the rate at which address messages are applied to the address switches 11.

Figure 3:
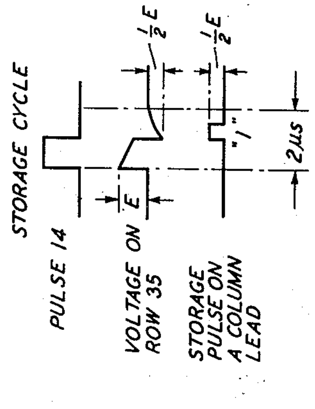
Fig. 3 is a time plot of various voltages during the storage cycle of a single information bit in the embodiment of Fig. 1.

Positioned in each of the row leads from the selection switch to the storage matrix is a differentiation circuit which may advantageously comprise, as seen in Fig. 2, a resistance 36 and a capacitance 37. In accordance with one aspect of this invention, pulse 14 which appears on row 35, as described above, is differentiated by this circuit. Turning now to Fig. 3, the voltage appearing on row 35 is there depicted and, as seen, is initially E volts in magnitude, though it may advantageously be more than E volts. This positive portion of the voltage appearing on row 35 is used to read out any information that may have been previously stored, thus destroying that information and preparing the storage condensers of that row for the storage of new information. The differentiation circuit 23 causes the voltage appearing on row 35 to decay due to the charging of the capacitance 37. The capacitance 37 and the resistance 36 in the differentiation circuit 23 are so related that the time constant of the circuit is such that when the initial pulse 14 is removed, the capacitance will have charged to a voltage +½E. Thus, on removal of the initial pulse, the voltage on row 35 will immediately drop to −½E.

In this way, in accordance with this invention, a read-out pulse of at least +E volts is first applied to the row to remove any information that may be stored in any of the memory cells or condensers of that row and then the same pulse applies the −½E volts to the row to aid in the storing of information in certain of the cells in that row, depending on the storage pulses applied to the column leads. These storage pulses are of magnitude +½E volts and, as seen in Fig. 3, occur at the instant the pulse 14 ceases and thus at the instant the voltage on the row lead drops to −½E volts.

As described above, certain of the condensers of the ferroelectric storage matrix 17 are chosen for the storage of bits of information in accordance with a code address identifying those condensers assigned that address. Let us now consider how coded bits of information are stored in these particular condensers. In the specific embodiments of this invention depicted in the drawing, the information to be stored comprises a message in the form of a binary code of sixteen digits. This information may be present in the system either in serial form, as shown in Fig. 1, or in parallel form, as shown in Fig. 7. When present in serial form in accordance with another aspect of this invention, fifteen one-digit delay lines 39 are provided with the column leads connected between the delay lines.

Figure 5:
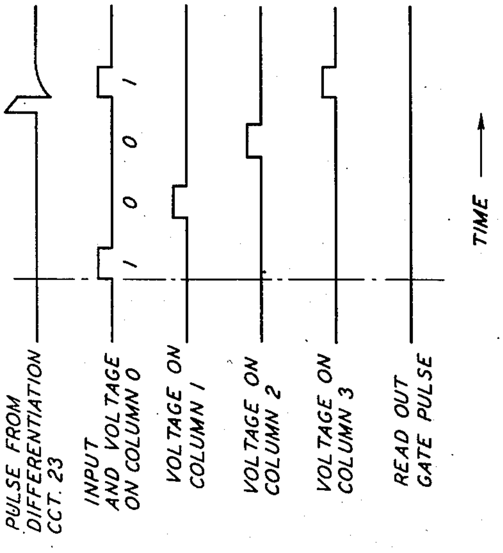

Turning now to Fig. 5, there is there shown a time plot of voltages appearing on the column leads for the zero, first, second, and third column of condensers in the matrix 17 of the embodiment of Fig. 1, and, to simplify the description, it is assumed that the information message contains but four bits of information. The input message is assumed to be the binary number "1001." As seen in Fig. 5, at the end of four digit intervals, the voltages appearing on the four column leads represent this number. The pulse 14 is applied to the chosen row of condensers before the occurrence of the last digit, which in the abbreviated message of Fig. 5 is just before the fourth digit time. Thus, as described above, the pulse from the differentiation circuit 23 clears the condensers in the row in which information is to be stored of any priorly filed information and applies a storage pulse at the appropriate time. Advantageously, the pulses appearing on the column leads are of a magnitude +½E volts.

Figure 6:
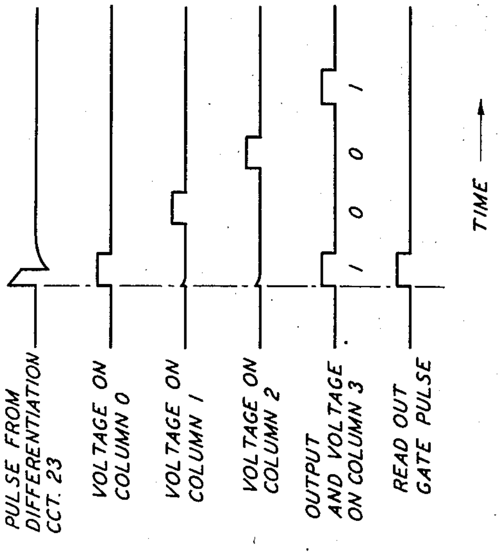
Figs. 5 and 6 are time plots of various voltages including the voltages in the delay lines during storage and read-out of a coded message in the embodiment of Fig. 1.

When it is desired to have the information read out also appear in serial form, as shown in the embodiments of Figs. 1 and 7, delay lines are again employed. Fig. 6 at a time plot of voltages for reading out the binary message "1001" stored, as above, again assuming that but four items of information are to be stored and not the sixteen that can be stored in a 256-bit storage matrix.

Due to the necessity of employing the delay lines to convert the serial input information to information appearing in parallel, the storage circuit depicted in Fig. 1 cannot read information out to the system and store new information on the occurrence of a single pulse 14. This, however, is readily attainable when the information is applied to the storage system in parallel, as depicted in the embodiment of Fig. 7.

The above discussion sets forth the operation of a specific embodiment of this invention in assigning information to a particular row of storage condensers, designated by an address, storing information in certain of those condensers, and reading out that information. It frequently occurs, however, that it is desirable to be able to read out information without destroying the indication of that information in the ferroelectric memory. In accordance with another aspect of this invention, single trip multivibrator circuits 41 are connected to the column leads from the matrix 17, as by being positioned between the one-digit delay lines 39 in the embodiment of Fig. 1 or directly in the column leads in the embodiment of Fig. 7. In the embodiment of Fig. 1, when information is to be stored, the pulse in traveling down the delay lines 39 trips the multivibrator circuits 41 and, at the instant of storage, i. e., when the pulse 14 is removed causing the voltage on the designated row lead to drop to −½E volts, as described above, those multivibrators which are tripped will apply storage voltage to the column leads. In this respect, the addition of the multivibrator circuits 41 makes no difference. However, when information is to be read out, a pulse 42 from a read pulse generator 43 enables an AND circuit 44 connected to each of the column leads. The output of each AND circuit is connected to the input of the multivibrator circuit which has its output connected to that column lead. Thus, the presence of an output pulse on a column lead together with the pulse 42 from the read pulse generator 43 causes the multivibrator connected to that lead to trip and provide a storage pulse in coincidence with the negative storage pulse from the differentiation circuits 23, as described above.

When storing information in the embodiment of Fig. 1, no read pulse 42 is supplied and, therefore, the AND circuits 44 are disabled, preventing the pulses read out by pulse 14 from passing through the AND circuits and tripping the multivibrator circuits 41 associated with the column lead on which the output pulse appears. The read-out pulse on the column lead is also applied to the intersection of the output of the multivibrator circuit 41 and the delay line 39. Advantageously, however, the attenuation in the delay line is such that the pulse when applied to the next multivibrator circuit 41 is of insufficient magnitude to trip that circuit, and thus no output pulses are transmitted along the delay lines. Diodes or rectifiers may also be included in the column lead poled so as to block these positive pulses read out from the matrix and prevent their being applied to the delay lines, if it is not desired to employ attenuation in the delay lines to prevent signals appearing at the output under these conditions.

Figure 4:
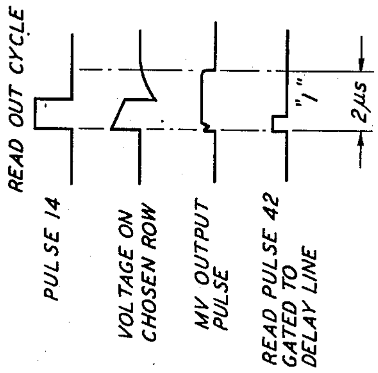
Fig. 4 is a time plot of various voltages during the read-out cycle of a single information bit in the embodiment of Fig. 1.

When the information stored in a given row of ferroelectric cells or condensers is interrogated or read out, small output pulses appear on the column leads where binary "1's" have been stored and these are gated, as described above, through the AND gates 44 to trip the multivibrator circuits 41. Fig. 4 is a time plot of this read-out and information restore cycle, and, as there clearly seen, the output pulse of the multivibrator circuits 41 in combination with the negative portion of the differentiated pulse puts back into storage the binary "1's" that have been just read out. The output pulses pass through the chain of alternate delay lines 39 and multivibrator circuits 41. The multivibrator circuits 41 act as pulse amplifiers and shapers, they trigger on the small binary "1" output pulse from a storage cell but not on the much smaller binary "0" pulse, and their generated pulse, as seen in Fig. 4, is of sufficient duration to overlap the negative portion of the differentiated pulse to restore the information. The amplitude ratio of the output pulses for binary "1" and "0" may be of the order of 3 or 4 to 1 for read-out pulses one microsecond in length. The multivibrator circuits 41 advantageously provide an output pulse several times the amplitude of the triggering pulse and twice the length of the read-out pulse. Conventional monostable multivibrator circuits may be employed.

Turning now to Fig. 7, in this embodiment of the invention, the multivibrator circuits 41 are connected directly in the column leads. When it is desired to read out information and restore that information in the storage matrix, the read-out pulse 42 is applied to an AND circuit 44. If it is desired to have the information output in serial form, the AND circuits are advantageously connected to leads tapped off a fifteen-digit delay line 48 at one-digit intervals. When it is desired to read out information without restoring it, as when new information is to be immediately stored utilizing the same timing pulse 14 for both read-out of priorly stored information and storage of new information, an inhibiting pulse 49 is applied from an inhibiting pulse generator 50 to a gate 51 located in the return or restore path of each of the multivibrators 41.

It is to be understood that the above-described arrangements are illustrative of the application of the principles of the invention. Numerous other arrangements may be devised by those skilled in the art without departing from the spirit and scope of the invention.

What is claimed is:

1. In a ferroelectric data storage circuit, a condenser comprising a dielectric of a ferroelectric material, means for generating a first pulse of a voltage sufficient to cause said material to reverse its polarization, a differentiation circuit comprising a capacitor and a resistor, the time constant of said circuit being such that said capacitor discharges to one half its initial voltage during the duration of said first pulse, means applying said first pulse to said differentiation circuit, means applying the output of said differentiation circuit to one plate of said condenser, and means applying a second pulse to the other plate of said condenser at the end of said first pulse, said second pulse being of the same polarity as said first pulse and substantially half the voltage magnitude.

2. In a ferroelectric data storage circuit, a condenser comprising a dielectric of a ferroelectric material, a differentiation circuit connected to one plate of said condenser, means applying a first pulse to said differentiation circuit, said pulse being of a polarity and voltage magnitude sufficient to read out information stored in said condenser, and means applying a second pulse to the other plate of said condenser on cessation of said first pulse, said second pulse and the output of said differentiation circuit on cessation of said first pulse being individually insufficient to store information in said condenser but when occurring together being of proper polarity and sufficient voltage magnitude to store information in said condenser.

3. In combination, a condenser having a dielectric of a ferroelectric material, a differentiation circuit comprising a capacitor and a resistor connected to one plate of said condenser, means applying a first pulse to said differentiation circuit, said pulse being of a polarity and voltage sufficient to read out information stored in said condenser, and means applying a second pulse of the same polarity as said first pulse to the other plate of said condenser on cessation of said first pulse, the charge on said capacitor on cessation of said first pulse and the voltage magnitude of said second pulse being individually insufficient to store information in said condenser but when occurring together being of proper polarity and sufficient voltage magnitude to store information in said condenser.

4. In the combination of claim 3, the time constant of said differentiation circuit being such that said capacitor charges to one half the voltage of said first pulse during the duration of said first pulse.

5. In a ferroelectric data storage circuit, a condenser having a dielectric of a ferroelectric material, a differentiation circuit including a capacitor connected to one plate of said condenser, means applying a pulse to said differentiation circuit of a polarity and voltage magnitude sufficient to read out information stored in said condenser, and means connected to the other plate of said condenser for cooperating with the voltage on said capacitor on cessation of said pulse for storing information in said condenser.

6. In a ferroelectric data storage circuit, a condenser having a dielectric of a ferroelectric material, differentiation circuit means connected to one plate of said condenser, and means applying a pulse to said circuit means of a polarity and sufficient voltage magnitude to read out information stored in said condenser, said differentiation circuit means applying a voltage of opposite polarity to said one plate on cessation of said pulse for the storage of information in said condenser.

7. In a ferroelectric data storage circuit, a condenser having a dielectric of a ferroelectric material, a capacitor and a resistor connected to one plate of said condenser, and means applying to said capacitor and said resistor a pulse of a polarity and sufficient voltage to read out information stored in said condenser, said capacitor being charged by said pulse so that a voltage of polarity opposite to that of said pulse is applied to said one plate on cessation of said pulse for the storage of information in said condenser.

8. In a ferroelectric data storage circuit, a plurality of ferroelectric condensers arranged in rows, first means electrically connecting one plate of each of said condensers in rows in one direction, second means electrically connecting the other plates of said condensers in columns in another direction, means for identifying a particular row of condensers to which information pertains, a differentiation circuit including a capacitor connected to each of said first connecting means, means applying a pulse to a particular one of said differentiation circuits determined by said identifying means, said pulse being of a polarity and voltage magnitude sufficient to read out information stored in said condensers, and means connected to said second connecting means for cooperating with the charge on said capacitor on cessation of said pulse for storing information in said condensers.

9. In a ferroelectric data storage circuit, a plurality of condensers each having a dielectric of a ferroelectric material, first means electrically connecting one electrode of each of said condensers in rows in one direction, second means electrically connecting the other electrode of said condensers in columns in another direction, a capacitor and a resistor connected to each of said first connecting means, and means applying to any one of said capacitors a pulse of a polarity and sufficient voltage to read out information stored in said condensers, said one capacitor being charged by said pulse so that a voltage of polarity opposite to that of said pulse is applied to said first connecting means on cessation of said pulse for the storage of information in said condensers.

10. In a ferroelectric data storage circuit, a plurality of ferroelectric condensers, first means connecting one plate of said condensers in rows in one direction, second means connecting the other plates of said condensers in columns in another direction, a differentiation circuit connected to each of said first means, means applying a first pulse to one of said differentiation circuits, said pulse being of a polarity and voltage magnitude sufficient to read out information stored in said condensers, and means applying a second pulse to certain of said second connecting means, said second pulse and the output of said differentiation circuit on cessation of said first pulse being individually insufficient to store information in said condensers but when occurring together being of proper polarity and sufficient voltage magnitude to store information in said condensers.

11. In a ferroelectric data storage system in accordance with claim 10 wherein said differentiation circuit comprises a capacitor and a resistor and has a time constant such that said capacitor has charged to a voltage approximately one half sufficient to store information in said condensers on cessation of said first pulse and said second pulse is of a magnitude substantially one half sufficient to store information in said condensers and of the same polarity as said first pulse.

12. In a ferroelectric data storage circuit, a condenser having a dielectric of a ferroelectric material, a differentiation circuit including a capacitor connected to one plate of said condenser, means applying a pulse to said differentiation circuit of a polarity and voltage magnitude sufficient to read out information stored in said condensers, and means connected to the other plate of said condenser for cooperating with the voltage on said capacitor on cessation of said pulse for restoring the information read out from said condenser.

13. In a ferroelectric data storage circuit, a condenser having a dielectric of a ferroelectric material, differentiation circuit means connected to one plate of said condenser, an output lead connected to the other plate of said condensers, means applying a pulse to said circuit means of a polarity and sufficient voltage magnitude to read out information stored in said condenser, said circuit means applying a voltage of opposite polarity to said one plate on cessation of said pulse for storage of information in said condenser, and pulse regeneration means connected to said output lead for applying a pulse to said output lead, said pulse from said pulse regeneration means and said voltage from said differentiation circuit means being of proper polarity and sufficient voltage magnitude to restore the information read out from said condenser.

14. In a ferroelectric storage circuit, a condenser having a dielectric of a ferroelectric material, means for applying a pulse to one plate of said condenser of a polarity and sufficient voltage magnitude to read out information stored in said condenser, an output lead connected to the other plate of said condenser, and means connected to said output lead for restoring the information in said condenser on read out after application of said pulse to said one plate, said last-mentioned means including a pulse regeneration circuit actuated by a read-out pulse on said output lead for applying a voltage to said output lead to restore the information in said condenser.

15. In a ferroelectric data storage circuit, a plurality of ferroelectric condensers arranged in rows, first means electrically connecting one side of each of said condensers in rows in one direction, second means electrically connecting the other side of each of said condensers in columns in another direction, means applying a pulse to one of said first connecting means, said pulse being of a polarity and voltage magnitude sufficient to read out information stored in said condensers, and pulse regenerating means connecting to each of said second connecting means, said pulse regenerating means being actuated by the appearance of information read out of said condensers on said second connecting means and applying a voltage to said second connecting means for restoring the information in said condenser.

16. In a ferroelectric data storage circuit, a plurality of ferroelectric condensers, first means connecting one plate of said condensers in rows in one direction, second means connecting the other plate of said condensers in columns in another direction, a differentiation circuit connected to each of said first connecting means, means applying a first pulse to one of said differentiation circuits, said pulse being of a polarity and voltage magnitude sufficient to read out information stored in said condensers, and means connected to said output leads for restoring the information in said condensers on read out after application of said pulse to said first connecting means, said restoring means including a pulse regeneration circuit actuated by the read-out information appearing on said second connecting means for applying a voltage to said second connecting means, said voltage from said pulse regeneration circuit and the output of said differentiation circuit on cessation of said first pulse being individually insufficient to restore the information in said condensers but when occurring together being of proper polarity and sufficient voltage magnitude to restore the information in said condensers.

17. In a ferroelectric data storage circuit, a plurality of ferroelectric condensers, first means electrically connecting one side of each of said condensers in rows in one direction, second means electrically connecting the other side of said condensers in columns in another direction, means for applying a first pulse to one of said first connecting means, a plurality of one-digit delay lines, pulse generating means connected intermediate adjacent delay lines, each of said pulse generation means being connected to one of said second connecting means, and means applying an information message of pulses in serial array to said pulse generating means and said delay lines, the voltage of the pulses generated by said pulse generating means in response to said information pulses and said first pulses being individually insufficient to reverse the polarization of said ferroelectric condensers but when occurring together being of sufficient voltage and proper polarity to cause reversal of said polarization.

18. In a ferroelectric data storage circuit, a plurality of ferroelectric condensers, first means electrically connecting one side of said condensers in rows in one direction, second means electrically connecting the other side of said condensers in columns in another direction, a differentiation circuit connected to each of said first connecting means, means applying a first pulse to one of said differentiation circuits, said pulse being of a polarity and voltage magnitude sufficient to read out information stored in said condensers, a plurality of one-digit delay lines, pulse generating means connected intermediate adjacent delay lines, each of said pulse generating means being connected to one of said second connecting means, and means applying an information message of pulses in serial array to said pulse generating means and said delay lines, the voltage of the pulses generated by said pulse generating means in response to said information pulses and the output of said differentiation circuit on cessation of said first pulse being individually insufficient to store information in said condensers but when occurring together being of proper polarity and sufficient voltage magnitude to store the information in said condensers.

19. In a ferroelectric data storage circuit, a plurality of ferroelectric condensers, first means connecting one plate of said condensers in rows in one direction, second means connecting another plate of said condensers in columns in another direction, a differentiation circuit including a capacitor connected to each of said first connecting means, means applying a first pulse to one of said differentiation circuits, said first pulse being of a polarity and voltage magnitude sufficient to read out information stored in said condensers, a pulse regeneration circuit connected to each of said second connecting means and actuated by said information read out on said second connecting means for applying a voltage to said second connecting means to restore said information to said condensers, said voltage from said pulse regeneration circuit and the output of said differentiation circuit on cessation of said first pulse being individually insufficient to restore the information in said condensers but when occurring together being of proper polarity and sufficient magnitude to restore the information in said condensers, means applying information pulses to said second connecting means in parallel, said information pulses cooperating with the output of said differentiation circuit on cessation of said first pulse to store information in said condensers, and means preventing the appearance of pulses from said pulse regeneration circuits on said second connecting means when it is desired to read out information from certain of said condensers and store new information in said certain condensers on application of a single first pulse to said differentiation circuit.

No references cited.